United States Patent [19]

Uhrich

[11] Patent Number: 4,880,510

[45] Date of Patent: Nov. 14, 1989

[54] METHOD FOR REMOVING DYE STUFFS FROM WASTEWATER

[75] Inventor: Kevin D. Uhrich, Amherst, N.Y.

[73] Assignee: Andco Environmental Processes, Inc., Amherst, N.Y.

[21] Appl. No.: 293,594

[22] Filed: Jan. 5, 1989

Related U.S. Application Data

[63] Continuation of Ser. No. 156,438, Feb. 16, 1988, abandoned, which is a continuation of Ser. No. 63,533, Jun. 18, 1987, abandoned.

[51] Int. Cl.$^4$ ................................................. C02F 1/46
[52] U.S. Cl. .................................... 204/131; 204/130; 204/149; 210/748
[58] Field of Search .................... 204/130, 131, 149; 210/748

[56] References Cited

U.S. PATENT DOCUMENTS 966,025  8/1910  Lautzenhiser et al. ............. 204/149

Primary Examiner—John F. Niebling
Assistant Examiner—David G. Ryser
Attorney, Agent, or Firm—Lowe, Price, LeBlanc, Becker & Shur

[57] ABSTRACT

A process for removing color impurities such as dye stuffs from wastewater solutions and simultaneously removing heavy metal contaminants is described. The process includes passing the wastewater solution through an electrolytic cell, having an anode of iron, an iron alloy, or an insoluble iron compound to generate ferrous iron at the anode which then reacts with hydroxide ion generated at the cathode causing a coprecipitation of the impurities with insoluble ferrous hydroxide.

7 Claims, No Drawings

METHOD FOR REMOVING DYE STUFFS FROM WASTEWATER

This application is a continuation of application Ser. No. 156,438 filed Feb. 16, 1988, now abandoned, which is a continuation of application Ser. No. 063,533 filed June 18, 1987, now abandoned.

This invention relates to a process for removing contaminants from a wastewater stream and in particular to removing color impurities including dye stuffs and other impurities such as heavy metals from industrial wastewater.

BACKGROUND OF THE INVENTION

Waste liquid or aqueous media containing toxic materials has presented an acute disposal problem. However, in accordance with the inventions described and claimed in U.S. Pat. Nos. 3,926,754; 4,036,726 and 4,123,339 assigned to the assignee of this invention, heavy metals such as hexavalent chromium ions were removed from cooling tower wastewater rapidly and efficiently, electrochemically. The disclosures of these patents are hereby incorporated by reference.

In the above patents a process and apparatus were described wherein wastewater containing hexavalent chromium ions is caused to flow between a plurality of electrodes. It was discovered that when the anode has a surface or a portion of the surface of iron, an iron alloy or an insoluble iron compound an iron compound such as iron hydroxide will be produced electrochemically. In turn an insoluble trivalent chromium compound, preferably as the hydroxide, will be produced which will complex with or otherwise physically or chemically combine with the insoluble iron compound to thereby permit removal from solution. Whereas it was previously considered necessary to reduce hexavalent chromium to trivalent chromium in acidic solution, it was discovered that the iron compound or complex formed will reduce the hexavalent chromium and co-precipitate therewith in a solution having a pH of about 4 to about 11. Accordingly, the invention described and claimed in said patents produces an insoluble iron-chromium precipitate without pH adjustment to thereby rapidly and efficiently remove hexavalent chromium from solution. The precipitate is then removed from aqueous media utilizing conventional techniques such as a clarifier, settling pond or the like and the aqueous media thereby clarified is suitable for disposal.

In this process, hexavalent chromium undergoes cathodic reduction to form trivalent chromium as insoluble chromichydroxide which complexes with iron which enters solution at the anode. The products are not susceptible to further electrolytic oxidation at the anode, back to hexavalent chromium, apparently due to the difference in ionization potential, at least in part, because the production of the hydroxide ion at the cathode occurs at a much lower potential than other electrode reactions. Thus, because of the non amphoteric state of the iron complex, the reaction continues until the undesirable contaminating ions are completely or substantially completely removed from solution in the aqueous media.

BRIEF SUMMARY OF THE INVENTION

It has now been discovered however that color impurities including dye stuffs in wastewater from for example carpeting or textile manufacturing facilities can be electrolytically removed in a cell with an anode of iron, an iron alloy, or at least a surface covered with an iron containing compound. The invention is not limited to the use of the cell described and claimed in the above referenced patent, however, that cell is preferred.

Accordingly, it is an object of this invention to provide a method simultaneously for removing dye stuffs and heavy metal contaminants from wastewater.

It is yet another object of this invention to provide a method for electrolytically cleaning wastewater from textile and carpet manufacturing facilities to remove impurities including dye stuffs in an electrolytic cell having an anode of iron, iron alloy, or an insoluble iron compound.

It is still another object of this invention to provide a method for precipitating dye stuffs whether water insoluble or soluble from wastewater by electrolytically generating ferrous ion at an anode and coprecipitating said dye stuff with ferrous hydroxide.

DETAILED DESCRIPTION OF THE INVENTION

These and other objects will become readily apparent with reference to the following description:

While this invention is not intended to be limited to the type of cell, as described above, it is preferred to use the electrolytic cell described and claimed in the above patents. This cell consists of a housing of an inert material such as polyvinyl chloride with a plurality of electrode plates closely spaced therein. The anode is composed of or at least covered with iron and may be of hot or cold rolled steel, stainless steel, another iron alloy, or an insoluble iron compound such as ferrous oxide or magnetite. The cathode preferably also is of iron but may be any other suitable electrolytic material compatible with the anode and electrolyte. An electric potential will be applied to an anode plate and a cathode plate, and preferably a plurality of iron plates will be disposed between the anode and the cathode in mutually spaced relationship.

The process of this invention is intended to be carried out at a pH of between 4 and 11, and preferably between 7 and 9 and at room temperature. At this pH, as will be subsequently described, color impurities will coprecipitate and in addition, heavy metals and other contaminates will also be removed. For example it is possible to remove phosphate, cyanide, cyanate, arsenate, pyroarsenate, antimonate, selenite and other such materials wherein the soluble form produces either an insoluble solid, preferably complex, forming with iron hydroxides or oxides or a gas. Typically ferrous ion is generated at the anode, and hydrogen gas at the cathode with the hydrogen gas being vented to the ambient atmosphere.

In the use of cold and hot rolled steel anodes a problem was encountered in commercial scale systems in the formation of adherent hydrous oxide gelatinous precipitates which can lead to blocking of flow channels in the cell, especially the passage between closely spaced stacked electrode plates. Another problem encountered was the formation of an insoluble insulating iron oxide layer on the electrode surface, often underneath the gelatinous precipitants which can give rise to high over voltages and generation of oxygen at the anode. In U.S. Pat. No. 4,123,339 this problem is solved by a periodic wash with a dilute inorganic acid and it is intended that continuous operation of the process of this invention would also include the periodic acid wash of the electrode plates described therein.

In addition, in the use of closely generally parallel plate electrodes including end electrodes to which the electrical potential is applied an electrode near at least one end electrode is positioned to protect the end electrode from flux field effects which would cause a more rapid consumption of the electrode. This feature is also described in U.S. Pat. No. 4,036,726 and that feature is preferred in the cell of this invention.

The following examples are intended to be illustrative of the process of this invention and not limitative. In each example, a test solution of known concentration was prepared with a pH adjusted between 7 and 9. The solution was then passed through an ANDCO M cell described in the above referenced patents at a controlled flow rate with a known current passing through the cell. As equilibrium was reached samples were removed, the pH was adjusted to about 8, if necessary, and one to three drops of a 0.2% anionic polymer to aid in flocculation was added per 100 milliliters of sample. The mixture was then filtered. Dwell time in the cell was the same as that for heavy metal removal, generally about one minute.

EXAMPLE I

Atlantic Paper Red P Liquid

This dye was obtained from Atlantic Chemical Corp., Nutley, New Jersey. The concentration of dye was found to be 9.1 ppm and the initial pH was 7.4. The pH was adjusted to 8.48 for treatment. Table I below describes the results at different flow rates and different direct current potential applied across the cell.

TABLE I

| FLOW (gpm) | AMPS/VOLTS | pH OUT | RESULTS |
|---|---|---|---|
| 0.2 | 10/16 | 9.22 | Colorless (not equilibrated) |
| 1.0 | 7.5/16 | 9.60 | Pink |
| 0.5 | 10/14.5 | | Pink |
| 0.2 | 12.5/17 | 9.30 | Pink |
| 0.3 | 12.5/16 | | Colorless |

It should be noted that the successful removal at 0.3 gpm and 12.5 volts was the result of a recycled solution. In order to remove all of the red dye it was necessary to recycle the solution through the cell several times.

EXAMPLE II

Indigo Dye

In this Example a 500 ppm concentration of Indigo dye in water was evaluated. This dye is a water insoluble dye existing as a very fine suspension. Table II below demonstrates the results of this test.

TABLE II

| FLOW (gpm) | AMPS | pH OUT | RESULTS |
|---|---|---|---|
| 0.4 | 5 | — | Clear colorless solution |
| 0.4 | 8 | — | Clear colorless solution |
| 0.4 | 9(18v) | — | Clear colorless solution |
| 0.2 | 9.3 | 9.40 | Clear colorless solution |
| 1.0 | 9 | 8.40 | Clear colorless solution |
| 1.8 | 9 | 8.5 | Clear colorless solution |
| 2.0 | 4 | 8.05 | Clear colorless solution |

As can be seen above, the process of this invention removed the dye from solution in each test. The pH of the solution prior to treatment was 8.38. It was also calculated that a concentration of 23 ppm ferrous ion was necessary to remove the 500 ppm of Indigo and therefore 0.046 ppm of ferrous ion was required per ppm of Indigo dye. Typically in the removal of heavy metals, 3 to 4 ppm ferrous ion will be required per ppm of heavy metal ion to be removed from solution.

EXAMPLE III

Vat Brilliant Green Dye

In this Example the concentration of Vat Brilliant Green dye was 264 ppm in the wastewater. The pH was initially 7.53 and then adjusted to 8.88 as shown below in Table III.

TABLE III

| FLOW (gpm) | AMPS | pH OUT | RESULTS |
|---|---|---|---|
| 0.6 | 3 | 7.78 | Colored supernate |
| 0.6 | 10 | 8.53 | Colored supernate |
| (pH adjust 8.88 using NaOH) | | — | — |
| 0.2 | 3 | 8.18 | Colored supernate |
| 0.2 | 10 | 9.91 | Colorless supernate |
| 0.6 | 10 | — | Colored supernate |
| 1.0 | 12 | — | Colored supernate |
| 0.3 | 12(15V) | — | Colorless supernate |

This dye appears to be partially soluble, and insoluble microparticles are present. The dye solution was initially filtered with No. 4 Whatman filter paper and no insoluble was collected. It was calculated that 0.7 ppm ferrous ion was required to remove 1 ppm Vat Brilliant Green dye.

EXAMPLE IV

Mixed Vat Dyes

A mixture was prepared of the following: Vat Olive, 213 milligrams; Vat Blue, 184 milligrams; Vat Brown, 194 milligrams, and Vat Yellow, 183 milligrams in two gallons of water. The mixture was a muddy brown/green solution or very fine suspension and passed through No. 4 Whatman filter paper without leaving any insoluble residue. The pH was initially 7.95 and was adjusted for treatment to 7.56. Table IV below illustrates the results.

TABLE IV

| SAMPLE | TIME | FLOW (gpm) | AMPS | pH OUT | RESULTS |
|---|---|---|---|---|---|
| — | $T_o$ = 2:15 | | | | |
| 1 | 2:18 | 1 | 10(6.5v) | 7.62 | Filters fast clear, colorless |
| 2 | 2:22 | 1 | 10(10v) | 7.91 | Filters fast clear, colorless |

In this Example, it was calculated that 0.68 ppm ferrous ion was required per ppm of dye mixture.

Many other dyes including Diazo Black, Sodyeko Black, Toron Black Sk, and Vitrolan Blue 26 were also successfully tested according to the process of this invention.

In summary, it has been discovered that dye stuffs and other color impurities as well as heavy metals and other contaminants can be removed from wastewater solutions by electrolytically generating ferrous ion in a cell having an anode of iron, iron alloy, or iron insoluble compound. Passing the wastewater solution through the cell while an electrical potential is applied across the anode and cathode, will, on continuous operation result in consumption of the iron anode and coprecipitation of the dye either with or on the surface of ferrous hydroxide as it precipitates to form a sludge. It is not known for certain that there is not also a chemical reaction involving the ferrous ion. The color impurities however are quickly and efficiently removed as precipitates so that the wastewater solution can be disposed of safely.

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method for electrochemically removing from an ionizing medium contaminants including color impurities and heavy metal ions which are capable of forming an insoluble iron compound or complex comprising the steps of: providing an electrochemical cell comprising a pair of outer electrodes elements which are, respectively, an anode and a cathode positioned in a parallel spaced apart relationship and a plurality of additional electrode elements disposed between said outer electrode elements in a closely spaced relationship therewith, aid additional elements being substantially equidistantly spaced one from another and disposed parallel to said outer electrodes; providing one of said additional electrode elements in neighboring relation to each of said outer electrode elements of sufficient size so as to extend beyond said outer electrode element so as to shield said outer electrode element from flux field effects causing excessive current density; passing an electric current through the ionizing medium containing the contaminants to be removed between said anode, which has a surface or a portion of a surface thereof of iron, iron alloy or insoluble iron compound, and said cathode so as to produce anodically an insoluble iron compound, species or complex in said ionizing medium while cathodically reacting said contaminant ion with the ionizing medium to generate an insoluble hydroxide thereof and whereby an insoluble iron compound or complex with the contaminants is produced, and removing said insoluble iron compound or complex with the contaminants from the ionizing medium.

2. The method of claim 1 wherein the pH of the medium is 4 to 11.

3. The method of claim 1 wherein the pH of the medium is 7 to 9.

4. The method of claim 1 wherein the color impurity is a commercial dye stuff.

5. The method of claim 1 wherein said ionizing medium is water and the reaction process includes an insoluble iron oxide, or hydroxide and hydrogen.

6. The method of claim 1 further comprising periodically treating the electrodes with a dilute inorganic acid solution by flowing said acid solution along and between the surfaces of said electrode at a flow rate sufficient to providing mechanical washing action to remove any electrochemically formed substances on the surfaces of or lodged between adjacent electrodes.

7. The method of claim 1 wherein said anode and cathode are rolled steel.

* * * * *